United States Patent [19]

Schultz

[11] 4,190,313
[45] Feb. 26, 1980

[54] SUPPORT FOR A MICROSCOPE OBJECTIVE

[75] Inventor: Richard P. Schultz, Williamsville, N.Y.

[73] Assignee: American Optical Corporation, Southbridge, Mass.

[21] Appl. No.: 906,544

[22] Filed: May 17, 1978

[51] Int. Cl.² ............................................. G02B 21/00
[52] U.S. Cl. ..................................................... 350/84
[58] Field of Search ..................... 350/84, 85, 225, 82, 350/92, 255, 254; D16/57

[56] References Cited
U.S. PATENT DOCUMENTS

| 2,449,156 | 9/1948 | Wittig | 350/84 |
| 2,530,352 | 11/1950 | Gallasch | 350/80 |
| 2,645,972 | 7/1953 | Aitcheson | 350/84 |
| 2,789,461 | 4/1957 | Leitz et al. | 350/84 |
| 3,064,529 | 11/1962 | Straat | 350/80 |
| 3,135,817 | 6/1964 | Wrigglesworth et al. | 350/84 |
| 3,768,885 | 10/1973 | Boughton et al. | 350/84 |
| 4,025,171 | 5/1977 | Peck | 350/255 |

Primary Examiner—John K. Corbin
Assistant Examiner—B. W. de los Reyes
Attorney, Agent, or Firm—Jeremiah J. Duggan; Alan H. Spencer; Stephen A. Schneeberger

[57] ABSTRACT

A support for an inverted microscope nosepiece. The support is spring-loaded to prevent accidental damage to its objectives and enable a change of objectives independently of focusing adjustments.

8 Claims, 3 Drawing Figures

SUPPORT FOR A MICROSCOPE OBJECTIVE

BACKGROUND OF THE INVENTION

1. Field of the Invention

This invention relates to microscopes and in particular to a support for an inverted microscope nosepiece.

2. Discussion of a Prior Art

Microscope mechanisms for adjusting the nosepiece relative to the stage have heretofore employed rocker arms biased against an operating cam by the weight of the nosepiece and its objectives whereby movement of the nosepiece toward the stage is effected by gravity, e.g. as in U.S. Pat. Nos. 3,135,817 and 3,768,885.

In such cases, the striking force of an objective accidentally contacting a specimen holder or the stage is minimal and inherently less than that usually required to cause appreciable, if any, harm to the objective.

In the system of an inverted microscope and/or others requiring direct mechanical linkage for adjusting nosepieces toward and away from the stage, the usual high mechanical advantage of the focusing mechanism fails to guard against and/or afford warning of accidental striking of the objective with damaging force.

It is, accordingly, an object of this invention to provide an improved support for a microscope noisepiece wherewith accidental damage to objectives can be avoided in systems employing direct mechanical linkages for focusing.

Another object is to accomplish the foregoing with minimal alteration and/or complication of current focusing systems.

Still another object is to provide an objective support which permits the changing of prefocused nosepiece objectives without need for focusing adjustment of the support.

Other objects and advantages of the invention will become apparent from the following description.

SUMMARY OF THE INVENTION

The foregoing objects and their corolaries are accomplished by providing a spring-loaded slide mount for the nosepiece support of a microscope system ordinarily requiring direct mechanical linkage for moving the support toward and away from the stage. In a preferred embodiment of the invention, the nosepiece support is slidably mounted upon the focusing mechanism for movement along the microscope viewing axis independently of the focusing mechanism. Spring-loading of the support against a fixed stop renders the support conventionally adjustable with the focusing mechanism but uniquely yieldable to independent sliding movement against its spring-loading by accidental striking of an objective against a specimen holder or the microscope stage. A predetermined spring-loading tension and sliding excursion assures against damage to the objective.

It is also contemplated that sufficient excursion be built into the spring-loading to enable an operator to change objectives without need for operation of the focusing mechanism.

Details of the invention will become more readily apparent from the following description when taken in conjunction with the accompanying drawings.

DESCRIPTION OF THE PREFERRED EMBODIMENTS

Figure 1:
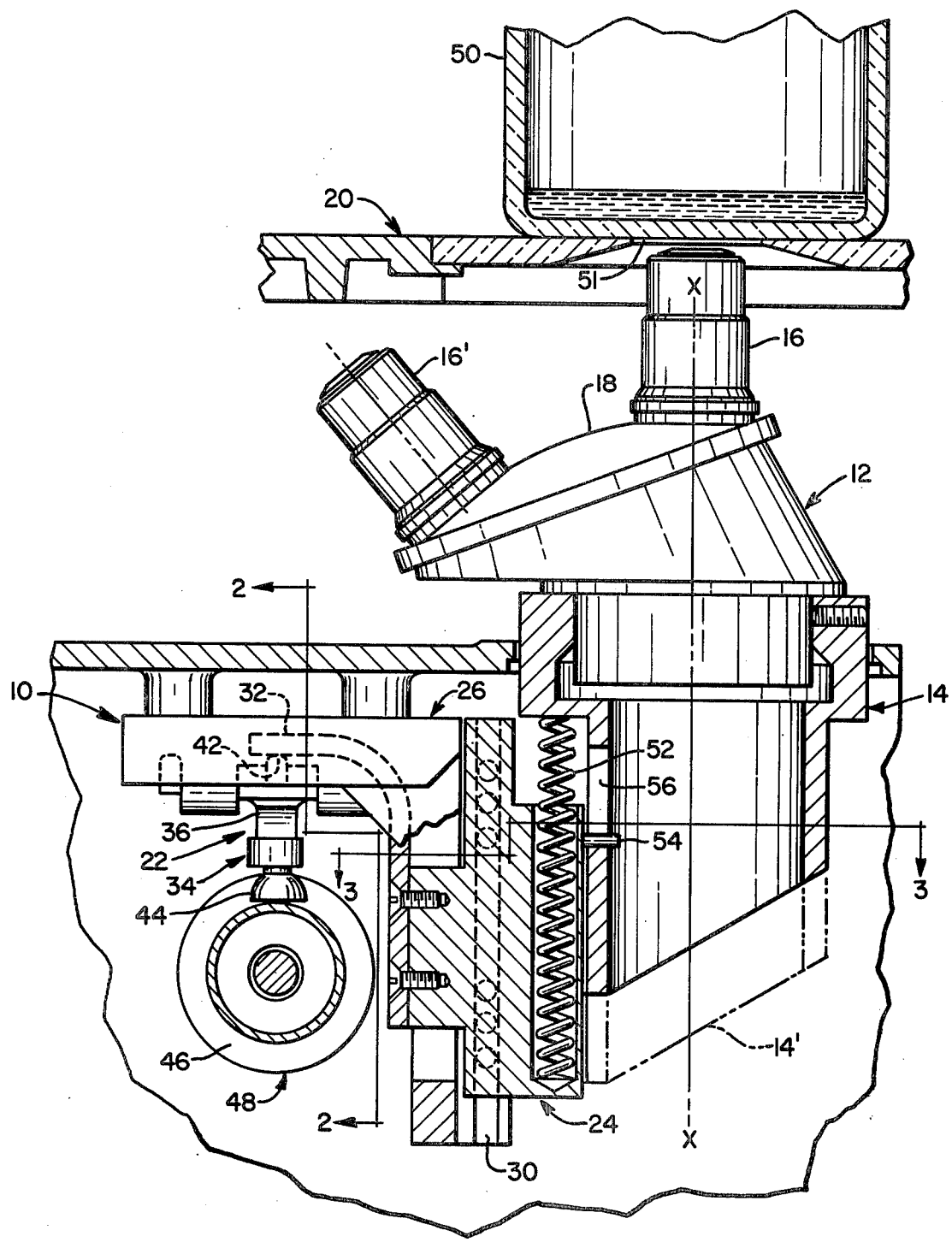
FIG. 1 is a partially cross-sectioned fragmentary illustration of a microscope objective support and focusing system incorporating a preferred embodiment of the invention.
Figure 3:
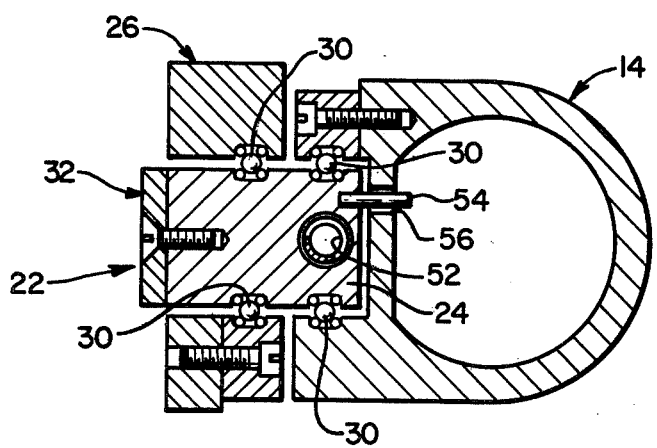
FIG. 3 is a cross-sectional view taken approximately along line 3—3 of FIG. 1.

In the drawings there is shown a support arm 10 for an inverted microscope and a nosepiece 12 mounted in carrier 14. In typical fashion, support arm 10 extends upwardly of the microscope base (not shown). In the inverted system of the illustrated microscope, however, nosepiece objectives 16, 16' on turret 18 are disposed beneath the microscope stage 20 and require direct mechanical linkage in focusing adjustment mechanism 22 for movement against gravity toward stage 20. Such adjustment mechanisms ordinarily fail to guard against and/or afford warning of accidental striking of the objective against a specimen holder or the microscope stage with damaging force. This being a major problem in the prior art is overcome by the present invention as follows:

According to the invention, nosepiece 12 is mounted in a support, i.e. carrier 14, which is slidably mounted upon a slide 24 itself slidably mounted upon a stationary bracket 26 of the mechanism 22. Bracket 26 is secured to support arm 10 by studs 28 (FIG. 3).

The resulting compound slide is preferably provided with ball-bearing races 30 (FIG. 3) for smooth, low friction action.

Figure 2:
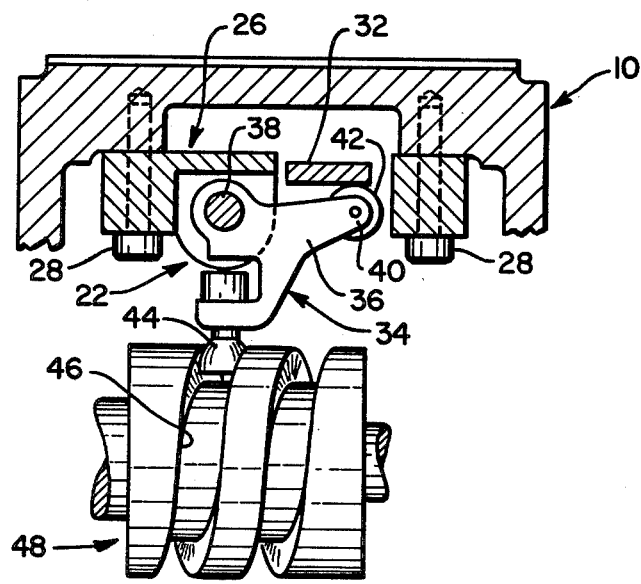
FIG. 2 is a cross-sectional view taken approximately along line 2—2 of FIG. 1.

Actuating lever 32 secured to slide 24 is operated by cam follower 34 which comprises rocker arm 36 supported by pin 38 which is fixed to bracket 26 (FIG. 2). Pin 38 provides a fulcrum for arm 36, the distal end 40 of which has roller 42 engaging the underside of lever 32. The proximal end 44 of cam follower 34 engages in helix 46 of cam 48 to effect a lifting and lowering of lever 32 and nosepiece carrier 14 with rotation of cam 48.

The lifting of lever 32, slide 24, nosepiece carrier 14 and nosepiece 12 as a unit results from counterclockwise movement of rocker arm 36 as viewed in FIG. 2. Lowering results from clockwise movement of arm 36, gravity keeping lever 32 in contact with roller 42 at all times.

Cam 48 may be rotated about its axis by conventional coarse and fine focusing means not shown. Those interested in details of suitable focusing means, however, may refer to U.S. Pat. No. 3,768,486.

Since the lifting of nosepiece 14 is subject to causing an objective 16 aligned with optical axis x—x to accidentally contact a specimen holder 50 (FIG. 1) or another objective 16' to strike stage 20 should objective 16 be permitted to pass through opening 51 in stage 20, damage to the affected objective is avoided by the present invention as follows:

Carrier 14 for nosepiece 12 is spring-loaded to a preestablished uppermost position on slide 24 of mechanism 22. Spring 52 extending into slide 24 provides the loading while stop pin 54 fixed to slide 24 and extending through slot 56 in carrier 14 establishes the maximum extent of upward excursion permitted of carrier 14 on slide 24. With the lowermost edge of slot 56 engaging pin 54, carrier 14 is stopped from further upward movement on slide 24. The length of slot 56 determines the extent of downward excursion permitted of carrier 14 on slide 24.

The upward force applied against carrier 14 by spring 52 is, with proper selection of spring material, temper and design caused to completely overcome the weight of carrier 14 and its nosepiece so that the carrier is normally fixed at the aforesaid uppermost position on slide 24. This renders nosepiece 12 adaptable to normal focusing of its objective by mechanism 22.

Upon accidental contact of the objective with a specimen holder 50, or the striking of another objective against stage 20, the engaged objective will be spared damage as a result of cushioning afforded by spring 52, i.e. carrier 14 will yield to a striking force less than sufficient to damage the objective.

While specimen holder 50 is illustrated as being in the form of a transparent beaker, it should be understood that other specimen containers such as flasks or jars of equal or heavier construction are commonly used in inverted microsopes and are similarly subject to being accidentally struck by microscope objectives.

According to another feature of the invention, the downward excursion permitted of carrier 14 by slot 56 allows nosepiece 14 to be manually depressed against spring 50, e.g. as illustrated with dot-dash outline 14', sufficiently to permit turret 18 to be rotated clear of stage 20 for changing objectives. This avoids need to upset the original setting of focus obtained with mechanism 22. Release of the depressed turret allows carrier 14 to return to its position against pin 54 bringing the selected objective automatically into its prefocused position.

Those skilled in the art will readily appreciate that there are various modifications and adaptations of the precise form of the invention here shown that may suit particular requirements. Accordingly, the foregoing illustrations are not to be interpreted as restrictive of the invention beyond that necessitated by the following claims.

I claim:

1. A support for an objective of a microscope having a focusing mechanism with objective attachment means thereon for moving said objective toward and away from a stage of the microscope to adjust said objective relative to a specimen to be observed on said stage, said support comprising:
    a carrier for said objective;
    means for slideably mounting said carrier on said attachment means, said mounting means permitting sliding movement of said carrier on said attachment means toward and away from said stage of said microscope independently of movement of said attachment means, said separate movements of said carrier and attachment means being in substantially parallel directions;
    a stop limiting the extent of said independent movement of said carrier on said attachment means;
    means for yieldingly biasing said carrier against said stop;
    whereby said objective with said attachment means may be moved toward and away from said stage by operation of said focusing mechanism while said objective is afforded protection against damaged by yielding of said biasing means to forces unduly resisting such movement and sliding of said carrier on said attachment means in a direction parallel to the direction of movement of said attachment means.

2. A support according to claim 1 wherein said biasing means comprises a compression spring.

3. A support according to claim 1 wherein said stop includes a pin fixed to said objective attachment means, said pin being extended through a slot in said carrier, said slot being directed substantially parallel to said movement of said carrier toward and away from said stage of said microscope and the length of said slot determining maximum sliding excursion permitted of said carrier on said attachment means.

4. A support according to claim 3 wherein said objective of said microscope extends from a turreted nosepiece which is in turn supported by said carrier, said nosepiece having at least one additional objective and said sliding excursion of said carrier permitting sufficient manual movement thereof away from said microscope stage to allow rotation of said nosepiece turret for substitution of said objectives one for another without need for operation of said focusing mechanism.

5. In a microscope having a stage, a support for a nose piece and a focusing mechanism with nose piece attachment means for moving said nose piece relative to said stage, the improvement comprising:
    a carrier for said nose piece;
    means for slideably mounting said carrier on said attachment means, said mounting means permitting sliding movement of said carrier on said attachment means toward and away from said stage independently of movement of said attachment means, said separate movements of said carrier and attachment means being in substantially parallel directions;
    a stop limiting the extent of said independent movement of said carrier on said attachment means;
    means for yieldingly biasing said carrier against said stop;
    whereby said nose piece with said attachment means may be moved toward and away from said stage by operation of said focusing mechanism while said nose piece is afforded protection against damage by yielding of said biasing means to forces unduly resisting such movement and sliding of said carrier on said attachment means in a direction parallel to the direction of movement of said attachment means.

6. The improvement in the microscope according to claim 5 wherein said biasing means comprises a compression spring.

7. The improvement in a microscope according to claim 5 wherein said stop includes a pin fixed to said nose piece attachment means, said pin extending through a slot in said carrier, said slot being directed substantially parallel to said movement of said carrier toward and away from said stage and the length of said slot determining maximum sliding excursion permitted of said carrier on said attachment means.

8. The improvement in a microscope according to claim 7 wherein said nosepiece includes a turret having a plurality of objectives and said sliding excursion of said carrier is rendered sufficient to permit manual movement thereof away from said stage to allow rotation of said turret for substitution of one of said objectives for another without need for operation of said adjustment mechanism.

* * * * *